United States Patent
Chen et al.

(10) Patent No.: US 8,870,440 B2
(45) Date of Patent: Oct. 28, 2014

(54) BACK LIGHT MODULE AND LIQUID CRYSTAL DISPLAY DEVICE HAVING THE SAME

(75) Inventors: Shih-Hsiang Chen, Guangdong (CN); Gege Zhou, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 179 days.

(21) Appl. No.: 13/515,248

(22) PCT Filed: May 9, 2012

(86) PCT No.: PCT/CN2012/075233
§ 371 (c)(1),
(2), (4) Date: Jun. 11, 2012

(87) PCT Pub. No.: WO2013/143204
PCT Pub. Date: Oct. 3, 2013

(65) Prior Publication Data
US 2013/0258704 A1     Oct. 3, 2013

(30) Foreign Application Priority Data
Mar. 30, 2012   (CN) .......................... 2012 1 0090885

(51) Int. Cl.
*F21V 8/00*    (2006.01)
*G02F 1/1333*  (2006.01)

(52) U.S. Cl.
USPC .............................. 362/634; 362/633; 349/58

(58) Field of Classification Search
CPC ..... G02F 1/0105; G02F 1/011; G02F 1/0045; G02F 1/0311; G02F 1/025; G02B 6/0086; G02B 6/0088
USPC .................. 362/97, 632, 633, 246, 297, 634; 349/58, 60, 64
See application file for complete search history.

(56) References Cited

U.S. PATENT DOCUMENTS

| | | | |
|---|---|---|---|
| 6,191,838 B1 * | 2/2001 | Muramatsu | 349/149 |
| 7,445,369 B2 * | 11/2008 | Yu et al. | 362/612 |
| 7,570,313 B2 * | 8/2009 | Wu et al. | 349/58 |
| 7,764,333 B2 * | 7/2010 | Kim | 349/58 |

(Continued)

FOREIGN PATENT DOCUMENTS

| CN | 202002027 U | 10/2011 |
|---|---|---|
| CN | 102235620 A | 11/2011 |

(Continued)

*Primary Examiner* — Peggy Neils
(74) *Attorney, Agent, or Firm* — Muncy, Geissler, Olds & Lowe, P.C.

(57) ABSTRACT

An LCD device includes a panel module and a back light module. The back light module includes a light guide plate having a light incident surface; a bezel for receiving the light guide plate, including a bottom plate and side walls surrounding the bottom plate; a reflective sheet disposed between the light guide plate and the bottom plate of the bezel; at least one lighting unit disposed in a position corresponding to the light incident surface; and a fixing unit including at least two fixing members, each fixing member has a base position and a bent portion vertically extending from at least one end of the base position. The top surface and the inner surface of the base position are closely attached to the light guide plate and the outer surface of the bent portion opposite to the inner surface thereof is closely attached to the side wall.

9 Claims, 9 Drawing Sheets

(56) References Cited

U.S. PATENT DOCUMENTS

| | | | |
|---|---|---|---|
| 8,430,551 B2* | 4/2013 | Kim et al. | 362/621 |
| 8,582,050 B2* | 11/2013 | Li et al. | 349/58 |
| 8,659,717 B2* | 2/2014 | Jang et al. | 349/58 |
| 2007/0253186 A1* | 11/2007 | Hsiao et al. | 362/97 |
| 2008/0309846 A1* | 12/2008 | Hong | 349/64 |
| 2011/0122333 A1* | 5/2011 | Kim et al. | 349/58 |
| 2012/0081630 A1* | 4/2012 | Yokota | 349/58 |
| 2012/0182733 A1* | 7/2012 | Cho | 362/235 |

FOREIGN PATENT DOCUMENTS

| | | |
|---|---|---|
| JP | 2008-112663 A | 5/2008 |
| KR | 20070000876 A | 1/2007 |
| KR | 20070001394 A | 1/2007 |

\* cited by examiner

BACK LIGHT MODULE AND LIQUID CRYSTAL DISPLAY DEVICE HAVING THE SAME

FIELD OF THE INVENTION

The present invention is related to a back light module and a liquid crystal display (LCD) device having the same, more particularly to a fixation way of a light guide plate.

BACKGROUND OF THE INVENTION

Because the LCD panel itself cannot emit light, an external light source is required for the LCD panel to display images. A back light module is mostly adopted by the conventional LCDs, and the back light module is used as a light source to provide light with uniform distribution and high brightness to the liquid crystal panel. The principle of the back light module involves spot light source or linear light source which is effectively converted into a surface light source having high brightness and even luminance. With improvement of latest technology for LCD displays, the light weight, compact size, low power consumption, high brightness and low manufacturing cost are considered as requirements in the market as well as exterior appearance. How to achieve the above-mentioned requirements to meet the market demands for back light modules is a challenge for researchers to overcome.

The components of the LCD device include a back plate, a panel module, a light guide plate, lamp strips, optical films, a bezel, and a front cover and so on. The panel module, optical films, lamp strips, and the light guide plate are accommodated in a space formed by the back plate, the bezel and the front cover. The light guide plate is fixed on the back plate by rivets, so as to prevent the light guide plate from shifting due to vibrations. If the position of the light guide plate is shifted, the uniformity and brightness of light will be affected so as to downgrade the performance of the LCD panel. Therefore, how to fix the light guide plate is quite important. FIG. 1 illustrates a conventional fixation way for fixing a light guide plate by using rivets. The light guide plate 2 is fixed on a back plate 1 by using rivets 3. However, in such a way, a plurality of cutting processes is required for manufacturing the light guide plate, which leads to cost-increasing. Besides, an optical defect may be generated by hot spots due to the rivets on the cutting area of the light guide plate. Especially in a product with thin bezels, such kind of problem is difficult to be solved.

Therefore, it is necessary to provide a light guide plate which doesn't require to proceed multiple cutting processes, so as to avoid the appearance problem in the conventional art, and to obtain a back light module with light weigh, compact size and low manufacturing cost and a LCD having the same.

SUMMARY

The objective of the present invention is to provide a back light module, in which a light guide plate can be fixed on a back plate without using rivets, so as to solve the appearance problem. In addition, the present invention intends to solve a technical problem of multiple cutting processes which increases manufacturing cost, labor working hours; in addition, the optical defect caused by hot spots in the conventional back light module can also be improved by the present invention. Moreover, plastic materials are used in the present invention instead of rivets, such that the present invention has a low manufacturing cost and can achieve the purposes of light weight and compact size.

To achieve the above-mentioned objectives, the present invention provides a back light module comprising: a light guide plate having a light incident surface; a bezel for receiving the light guide plate, including a bottom plate and side walls surrounding a periphery of the bottom plate; a reflective sheet disposed between the light guide plate and the bezel; at least one lighting unit, disposed in a position corresponding to the light incident surface; and a separate fixing unit including at least two fixing members. Each of the fixing members has a base position and a bent portion vertically extending from at least one end of the base position. The top surface of the base position is closely attached to the light guide plate. An inner surface of the bent portion is closely attached to the light guide plate, and an outer surface of the bent portion opposite to the inner surface thereof is closely attached to the side walls, so as to fix the light guide plate.

In one embodiment of the present invention, the bezel has a bottom plate, and the side walls are vertically extended from the periphery of the bottom plate.

In one embodiment of the present invention, the fixing unit is disposed on the periphery of the light guide plate, and the fixing unit includes at least two fixing members, and the light guide plate is disposed on an area defined by the top surface of the base position and the inner surface of the bent portion of the fixing member.

In one embodiment of the present invention, the periphery of the light guide plate is disposed with a fixing unit, the light guide plate and the fixing unit are received in the bezel and disposed on the top surface of the bottom plate of the bezel.

In one embodiment of the present invention, the fixing member is made of a plastic material, and the plastic material is at least one of Polyethylene terephthalate (PET) or Polystyrene (PS).

In one embodiment of the present invention, the fixing unit includes two fixing members and the two fixing members are disposed on two corresponding corners of the light guide plate, respectively; however, in one embodiment, the fixing unit may be disposed at two corresponding lateral sides of the light guide plate. However, in one embodiment, the two fixing units include four fixing members, and the four fixing members are respectively disposed on each corner of the light guide plate.

A liquid crystal display (LCD) device includes a liquid crystal panel and the aforesaid back light module. The back light module comprises: a light guide plate having a light incident surface; a bezel for receiving the light guide plate, including a bottom plate and side walls surrounding a periphery of the bottom plate; a reflective sheet disposed between the light guide plate and the bezel; at least one lighting unit, disposed in a position corresponding to the light incident surface; and a fixing unit including at least two fixing members. Each of the fixing members has a base position and a bent portion vertically extending from at least one end of the base position. The top surface of the base position is closely attached to the light guide plate. An inner surface of the bent portion is closely attached to the light guide plate, and an outer surface of the bent portion opposite to the inner surface thereof is closely attached to the side wall, so as to fix the light guide plate.

To sum up, the advantages of the back light module and the LCD having the same of the present invention lie in that: with regard to the manufacturing process, the cutting process for the light guide plate is reduced as well as manufacturing costs and labor working hours, so as to increase product yield. With regard to the optical quality, hot spots will not easy to occur on the edge portions of the light guide plate, so as to improve the image quality. In addition, without using rivets as taught by the prior art to fix the light guide plate, the cost and labor working hours for manufacturing LCD devices can be reduced. Moreover, a thin bezel, light weight and compact size design can also be achieved according to the present invention.

To enable a further understanding of the objectives and the technological methods of the invention herein, the brief description of the drawings below is followed by the detailed description of the preferred embodiments.

DETAILED DESCRIPTION OF THE EMBODIMENTS

Reference will now be made in detail to the preferred embodiment of the present disclosure, examples of which are illustrated in the accompanying drawings.

Figure 1:
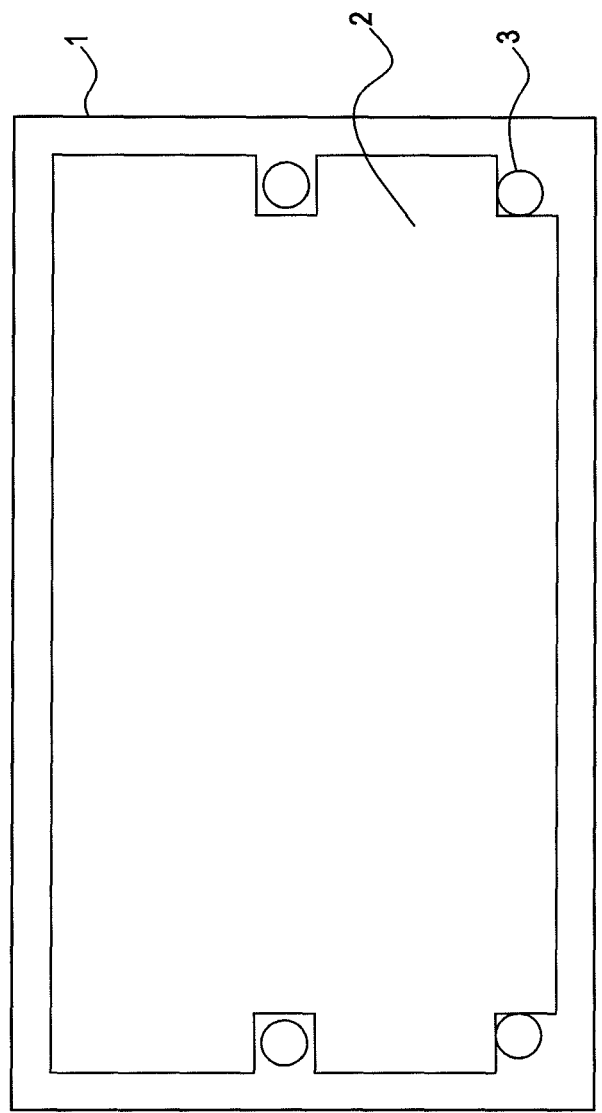
FIG. 1 is a top view illustrating a conventional fixation way for fixing a light guide plate by using rivets.
Figure 2:
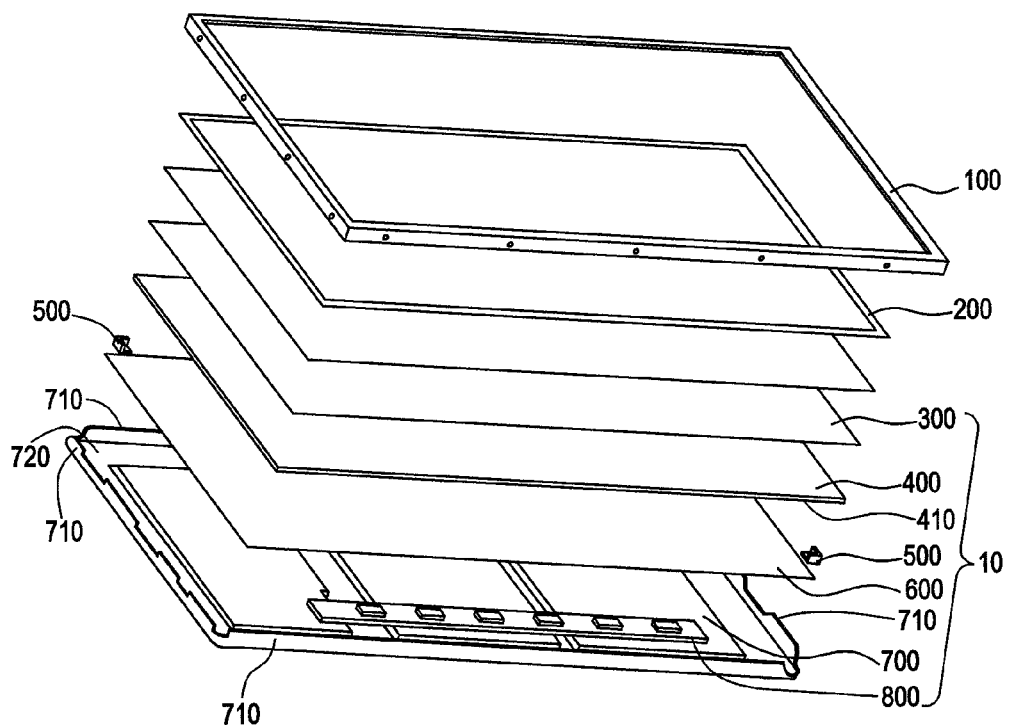
FIG. 2 is a perspective view of a liquid crystal panel device including a back light module according to a first embodiment of the present invention.
Figure 3:
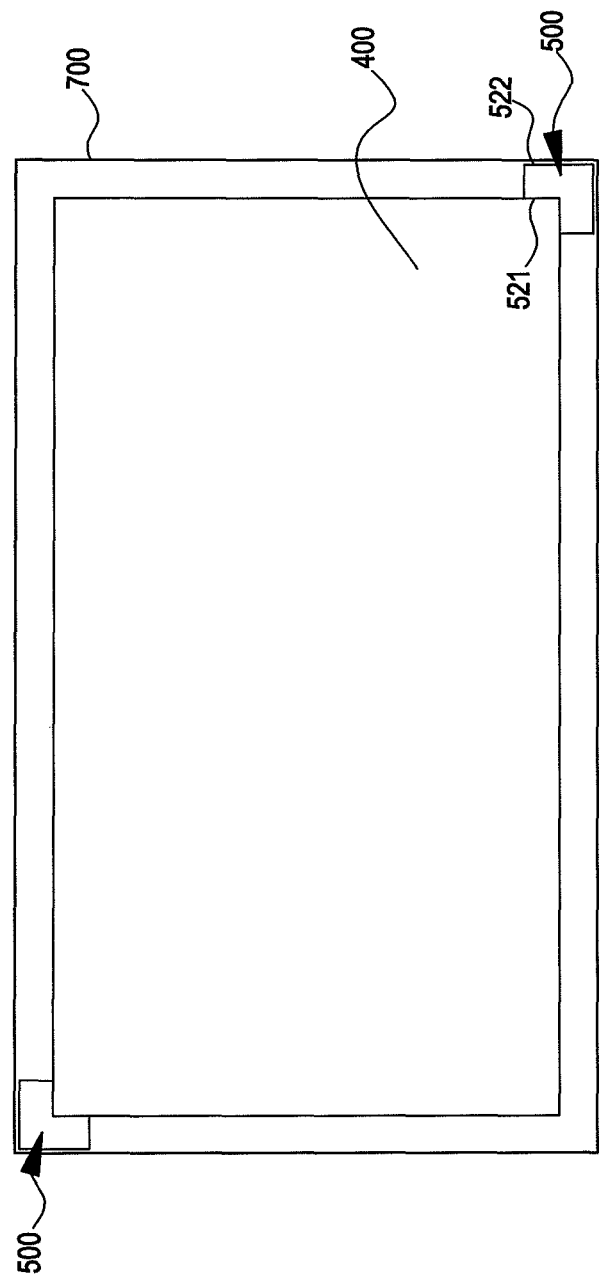
FIG. 3 is a top view of the back light module according to the first embodiment of the present invention.
Figure 4:
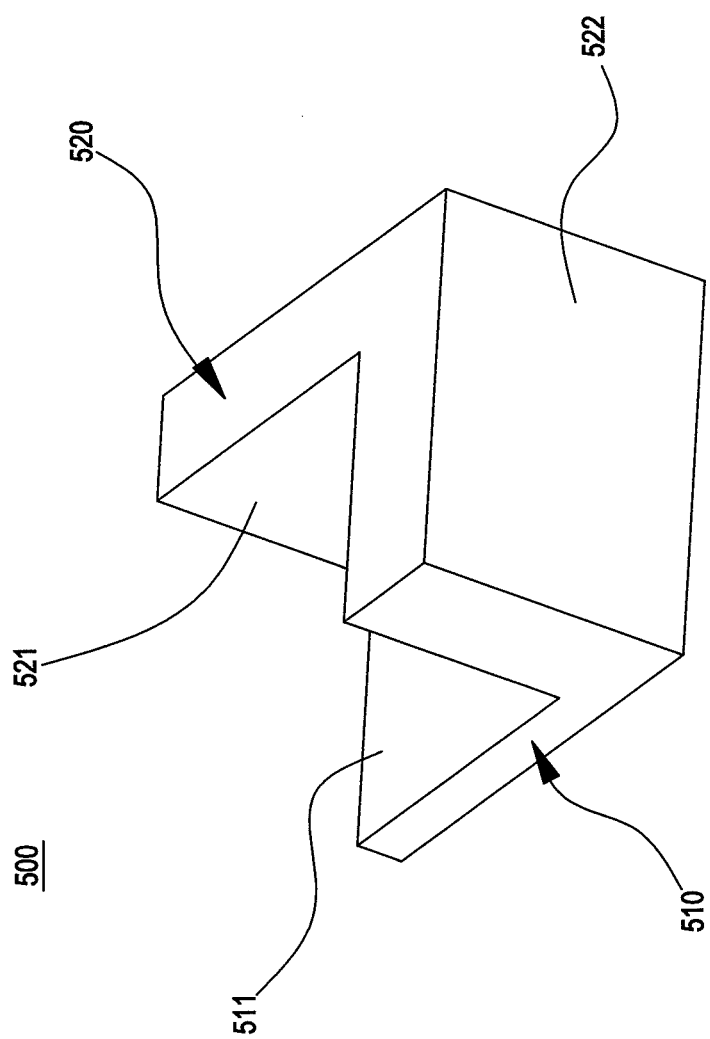
FIG. 4 is a stereogram showing a bent portion vertically extending from two adjacent ends of the fixing member according to the present invention.

FIG. 2 is a perspective view of a liquid crystal panel device including a back light module according to a first embodiment of the present invention, FIG. 3 is a top view of the back light module according to the first embodiment of the present invention, and FIG. 4 is a stereogram showing a bent portion vertically extending from two adjacent ends of the fixing member according to the present invention. The back light module disclosed by the present invention comprises: a light guide plate 400 having a light incident surface 410; a bezel 700 for receiving the light guide plate 400, including a bottom plate 720 and side walls 710 surrounding the periphery of the bottom plate 720; a reflective sheet 600 disposed between the light guide plate 400 and the bottom plate 720 of the bezel 700; at least one lighting unit 800 disposed in a position corresponding to the light incident surface 410 of the light guide plate 400; and a fixing unit including at least two fixing members 500.

In the back light module 10, the functions of the light guide plate 400 are to guide and uniformly distribute the light emitted from the lighting unit 800. The light guide plate 400 is disposed above the bottom plate 720 of the bezel 700. The reflective sheet 600 is disposed between the bottom plate 720 of the bezel 700 and the light guide plate 400, and the reflective sheet 600 is used for increasing the reflectivity of light so as to avoid light leakage.

The bezel 700 has a bottom plate 720, and side walls 710 are vertically extended from the periphery of the bottom plate 720.

The fixing unit is disposed on the periphery of the light guide plate 400, and the fixing unit includes at least two fixing members 500. The light guide plate 400 is disposed on an area defined by the top surface 511 of the base position 510 and the inner surface 521 of the bent portion 520 of the fixing member 500.

The periphery of the light guide plate 400 is disposed with the fixing unit. The light guide plate 400 and the fixing unit are received in the bezel 700, and disposed above the bottom plate 720 of the bezel 700.

The fixing unit includes two fixing members 500 which are correspondingly disposed on the corners of the light guide plate 400. Each fixing member 500 has a base position 510 and a bent portion 520 vertically extending from two adjacent ends of the fixing member 500. The top surface 511 of the base position 510 is closely attached to the light guide plate 400, the inner surface 521 of the bent portion 520 is closely attached to the light guide plate 400, and the outer surface 522 of the bent portion 520 opposite to the inner surface 521 is closely attached to the side wall 711 of the bezel 700, so as to fix the light guide plate 400.

The fixing member 500 is made of a plastic material, and the plastic material is at least one of Polyethylene terephthalate (PET) or Polystyrene (PS).

A liquid crystal panel device 20 comprises the aforesaid back light module 10, a front cover 100, a panel module 200 and an optical film 300. The back light module 10 includes the light guide plate 400 having a light incident surface 410; the bezel 700 for receiving the light guide plate 400, including a bottom plate 720 and side walls 710 surrounding a periphery of the bottom plate 720; the reflective sheet 600 disposed between the light guide plate 400 and the bottom plate 720 of the bezel 700; at least one lighting unit 800, disposed in a position corresponding to the light incident surface 410 of the light guide plate 400; and the fixing unit, including at least two fixing members 500 which are disposed on the two corresponding corners of the light guide plate 400. Each of the fixing members 500 has the base position 510 and the bent portion 520 vertically extending from two adjacent ends of the base position 510. The top surface 511 of the base position 510 is closely attached to the light guide plate 400, the inner surface 521 of the bent portion 520 is closely attached to the light guide plate 400, and the outer surface 522 of the bent portion 520 opposite to the inner surface 521 is closely attached to the side wall 710, so as to fix the light guide plate 400.

Figure 5:
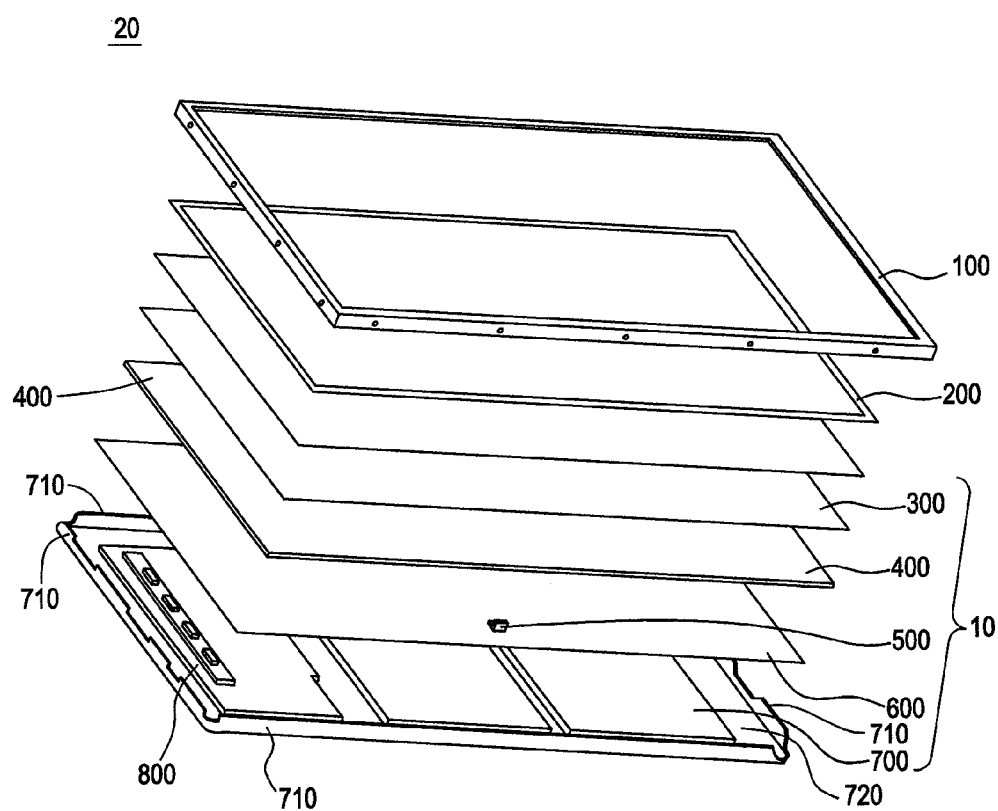
FIG. 5 is a perspective view of a liquid crystal panel device including a back light module according to a second embodiment of the present invention.
Figure 6:
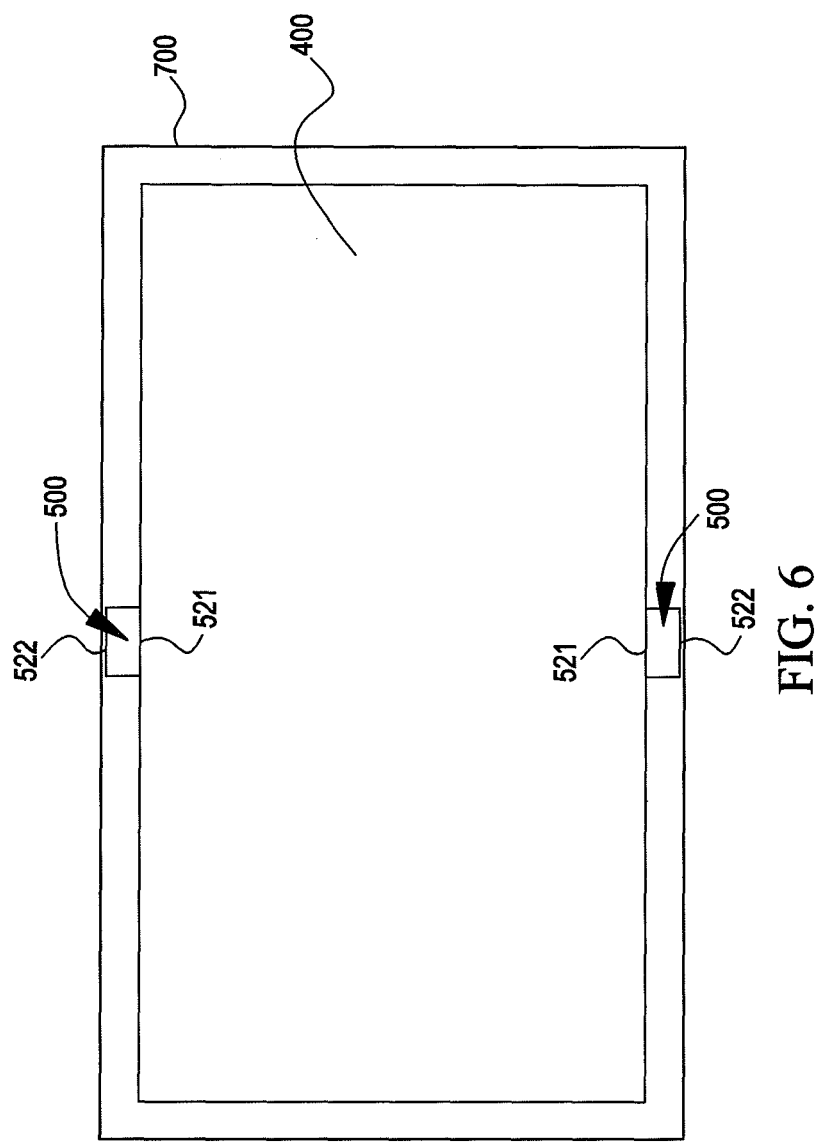
FIG. 6 is a top view of the back light module according to the second embodiment of the present invention.
Figure 7:
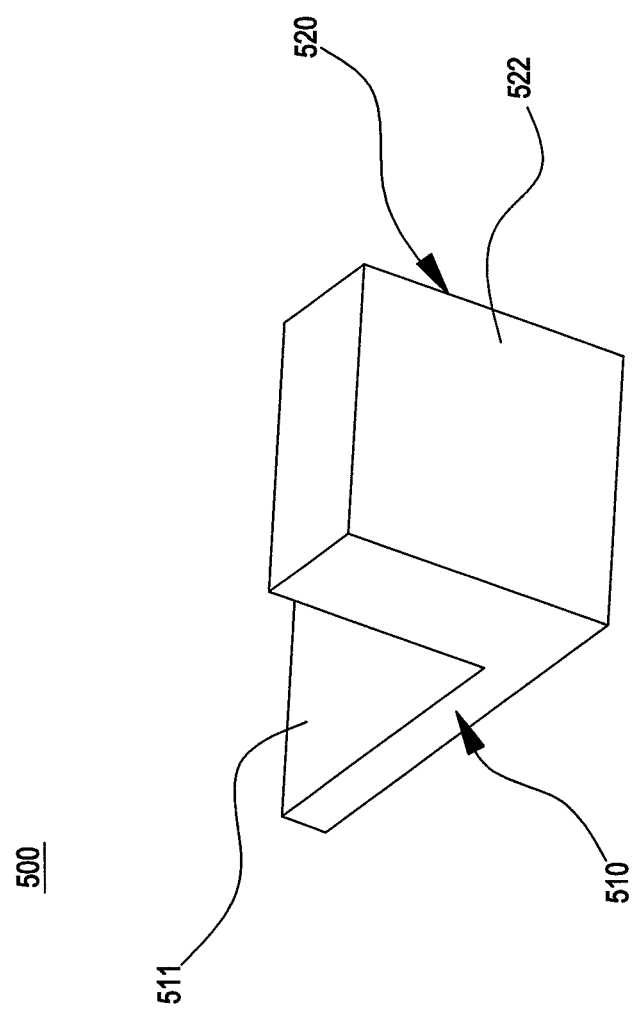
FIG. 7 is a stereogram showing a bent portion vertically extending from one end of the fixing member according to the present invention.

FIG. 5 is a perspective view of a liquid crystal panel device including a back light module according to a second embodiment of the present invention, FIG. 6 is a top view of the back light module according to the second embodiment of the present invention, and FIG. 7 is a stereogram showing a bent portion vertically extending from one end of the fixing member according to the present invention. The structure of a back light module 10 of the second embodiment is identical to that of first embodiment, such that a full description of the back light module 10 will be not repeated herein. The differences between the first embodiment and the second embodiment lie in that: a fixing unit includes two fixing members 500 which are disposed on two corresponding lateral sides of the light guide plate 400. Each of the fixing members 500 has a base position 510 and a bent portion 520 vertically extending from one end of the base position 510. A top surface 511 of the base position 510 is closely attached to the light guide plate 400. An inner surface 521 of the bent portion 520 is closely attached to the light guide plate 400, and an outer surface 522 of the bent portion 520 opposite to the inner surface 521 thereof is closely attached to a side wall 710, so as to fix the light guide plate 400.

A liquid crystal panel device 20 comprises the aforesaid back light module 10, a front cover 100, a panel module 200 and an optical film 300. The back light module 10 includes the light guide plate 400 having a light incident surface 410; a bezel 700 for receiving the light guide plate 400, including a bottom plate 720 and side walls 710 surrounding a periphery of the bottom plate 720; a reflective sheet 600 disposed between the light guide plate 400 and the bezel 700; at least the lighting unit 800, disposed in a position corresponding to the light incident surface 410 of the light guide plate 400; and the fixing unit including two fixing members 500 which are correspondingly disposed on the two lateral sides of the light guide plate 400. Each of the fixing members 500 has the base position 510 and the bent portion 520 vertically extending from one end of the base position 510. The top surface 511 of the base position 510 is closely attached to the light guide plate 400. The inner surface 521 of the bent portion 520 is closely attached to the light guide plate 400, and the outer surface 522 of the bent portion 520 opposite to the inner surface 521 thereof is closely attached to the side wall 710, so as to fix the light guide plate 400.

Figure 8:
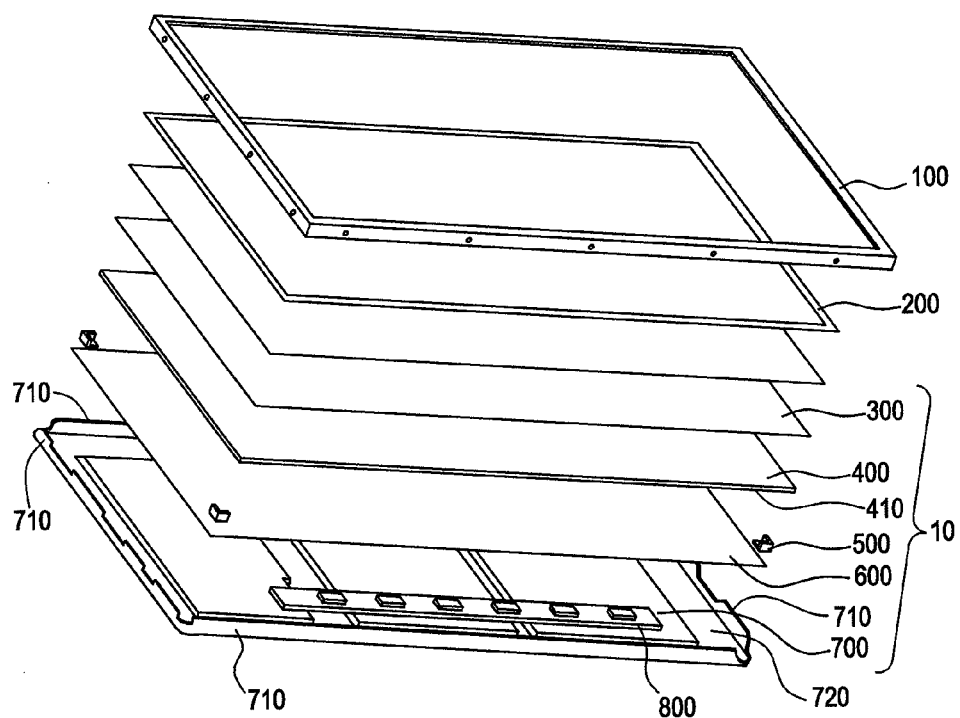
FIG. 8 a perspective view of a liquid crystal panel device including a back light module according to a third embodiment of the present invention.
Figure 9:
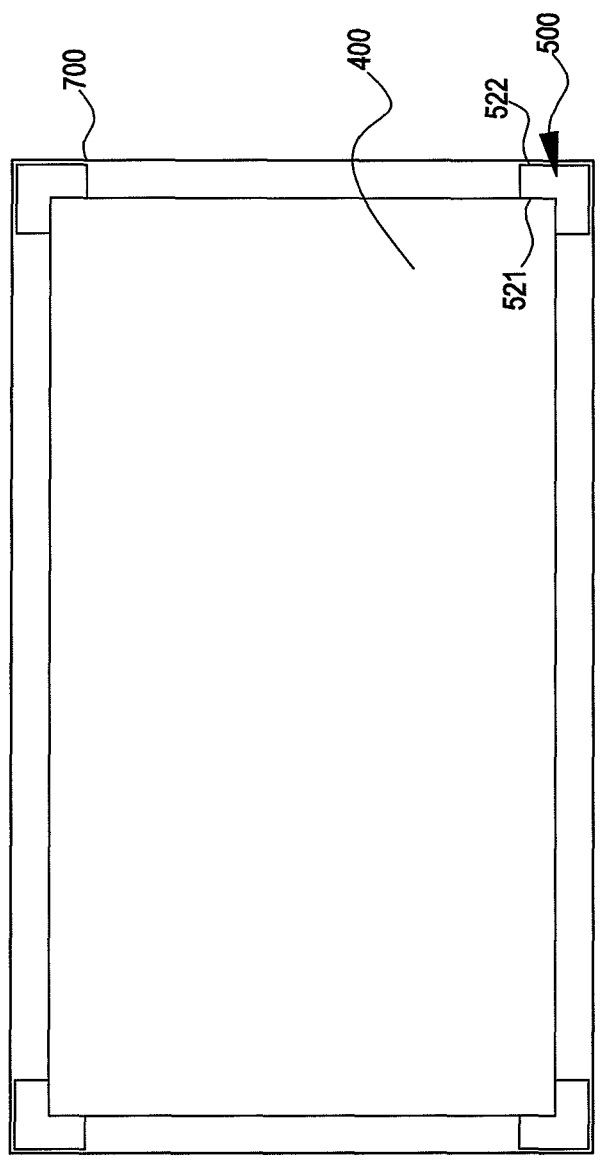
FIG. 9 is a top view of the back light module according to the third embodiment of the present invention.

FIG. 8 is a perspective view of a liquid crystal panel device including a back light module according to a third embodiment of the present invention, FIG. 9 is a top view of the back light module according to the third embodiment of the present invention, and FIG. 4 is a stereogram showing a bent portion vertically extending from two adjacent ends of the fixing member according to the present invention. The structure of a back light module 10 of the third embodiment is identical to that of first embodiment and the second embodiment, such that a full description of the back light module 10 will be not repeated herein. The differences from the first embodiment and the second embodiment lie in that: two fixing units are included in the embodiment. A fixing unit includes two fixing members 500, so that two fixing units include four fixing members, and the four fixing members are respectively disposed at each corner of the light guide plate 400. Each of the fixing members 500 has a base position 510 and a bent portion 520 vertically extending from two lateral sides of the base position 510. A top surface 511 of the base position 510 is closely attached to the light guide plate 400. An inner surface 521 of the bent portion 520 is closely attached to the light guide plate 400, and an outer surface 522 of the bent portion 520 opposite to the inner surface 521 thereof is closely attached to the side walls 710, so as to fix the light guide plate 400.

A liquid crystal display device 20 comprises the aforesaid back light module 10, a front cover 100, a panel module 200 and an optical film 300. The back light module 10 includes the light guide plate 400 having a light incident surface 410; a bezel 700 for receiving the light guide plate 400, including a bottom plate 720 and side walls 710 surrounding a periphery of the bottom plate 720; a reflective sheet 600 disposed between the light guide plate 400 and the bottom plate 720 of the bezel 700; at least one lighting unit 800, disposed in a position corresponding to the light incident surface 410 of the light guide plate 400; and two fixing units which include four fixing members because each fixing units is including two fixing members 500. The four fixing members are respectively disposed at each corner of the light guide plate 400. Each of the fixing members 500 has the base position 510 and the bent portion 520 vertically extending from one end of the base position 510. The top surface 511 of the base position 510 is closely attached to the light guide plate 400, the inner surface 521 of the bent portion 520 is closely attached to the light guide plate 400, and the outer surface 522 of the bent portion 520 opposite to the inner surface 521 is closely attached to the side walls 710, so as to fix the light guide plate 400.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A back light module, comprising:
   a light guide plate having a light incident surface and disposed above a bottom plate of a bezel,
   wherein the bezel is used for receiving the light guide plate, including the bottom plate and side walls surrounding a periphery of the bottom plate;
   a reflective sheet disposed between the light guide plate and the bottom plate of the bezel;
   at least one lighting unit disposed in a position corresponding to the light incident surface; and
   a separate fixing unit including at least two fixing members, each of the fixing members has a base position and a bent portion vertically extending from two ends of the base position in a same direction, a top surface of the base position is closely attached to the light guide plate, an inner surface of the bent portion is closely attached to the light guide plate, and an outer surface of the bent portion opposite to the inner surface thereof is closely attached to the side wall so as to fix the light guide plate, wherein the light guide plate is disposed on an area defined by the top surface of the base position and the inner surface of the bent portion of the fixing member, and wherein when the two fixing units include four fixing members, and the four fixing members are correspondingly disposed at each corner of the light guide plate.

2. A back light module, comprising:
   a light guide plate(LGP) having a light incident surface;
   a bezel used for receiving the light guide plate, including a bottom plate and side walls surrounding a periphery of the bottom plate;
   a reflective sheet disposed between the light guide plate and the bottom plate of the bezel;
   at least one lighting unit disposed in a position corresponding to the light incident surface; and
   a separate fixing unit including at least two fixing members, each of the fixing members has a base position and a bent portion vertically extending from two ends of the base position in a same direction, a top surface of the base position is closely attached to the light guide plate, an inner surface of the bent portion is closely attached to the light guide plate, and an outer surface of the bent portion opposite to the inner surface is closely attached to the side wall so as to fix the light guide plate, wherein the light guide plate is disposed on an area defined by the top surface of the base position and the inner surface of the bent portion of the fixing member.

3. The back light module as claimed in claim 2, wherein the light guide plate is disposed above the bottom plate of the bezel.

4. The back light module as claimed in claim 2, wherein the fixing unit includes two fixing members, and the two fixing members are disposed on two corresponding corners of the light guide plate.

5. The back light module as claimed in claim 2, wherein when the two fixing units include four fixing members, the four fixing members are respectively disposed at each corner of the light guide plate.

6. The back light module as claimed in claim 2, wherein the fixing member is made of a plastic material.

7. The back light module as claimed in claim 2, wherein is the fixing member is made of at least one of Polyethylene terephthalate (PET) or Polystyrene (PS).

8. A liquid crystal display device including a panel module and a back light module, the back light module comprising:
   a light guide plate having a light incident surface;
   a bezel for receiving the light guide plate, including a bottom plate and side walls surrounding a periphery of the bottom plate;
   a reflective sheet disposed between the light guide plate and the bottom plate of the bezel;
   at least one lighting unit disposed in a position corresponding to the light incident surface of the light guide plate; and
   a separate fixing unit including at least two fixing members, each of the fixing members has a base position and a bent portion vertically extending from two ends of the base position, a top surface of the base position is closely attached to the light guide plate, an inner surface of the bent portion is closely attached to the light guide plate, and an outer surface of the bent portion opposite to the inner surface thereof is closely attached to the side wall so as to fix the light guide plate, wherein the light guide plate is disposed on an area defined by the top surface of the base position and the inner surface of the bent portion of the fixing member.

9. The liquid crystal display device as claimed in claim 8, wherein when the two fixing units include four fixing members, the four fixing members are respectively disposed at each corner of the light guide plate.

\* \* \* \* \*